(12) United States Patent
Ghoshal et al.

(10) Patent No.: US 11,061,822 B2
(45) Date of Patent: Jul. 13, 2021

(54) METHOD, APPARATUS, AND SYSTEM FOR REDUCING PIPELINE STALLS DUE TO ADDRESS TRANSLATION MISSES

(71) Applicant: QUALCOMM Incorporated, San Diego, CA (US)

(72) Inventors: Pritha Ghoshal, Raleigh, NC (US); Niket Choudhary, Bangalore (IN); Ravi Rajagopalan, Cary, NC (US); Patrick Eibl, Durham, NC (US); Brian Stempel, Raleigh, NC (US); David Scott Ray, Austin, TX (US); Thomas Philip Speier, Wake Forest, NC (US)

(73) Assignee: Qualcomm Incorporated, San Diego, CA (US)

( * ) Notice: Subject to any disclaimer, the term of this patent is extended or adjusted under 35 U.S.C. 154(b) by 65 days.

(21) Appl. No.: 16/113,141

(22) Filed: Aug. 27, 2018

(65) Prior Publication Data
US 2020/0065260 A1 Feb. 27, 2020

(51) Int. Cl.
G06F 12/00 (2006.01)
G06F 13/00 (2006.01)
G06F 13/28 (2006.01)
G06F 12/1027 (2016.01)

(52) U.S. Cl.
CPC .. *G06F 12/1027* (2013.01); *G06F 2212/1021* (2013.01); *G06F 2212/30* (2013.01); *G06F 2212/50* (2013.01); *G06F 2212/68* (2013.01); *G06F 2212/684* (2013.01)

(58) Field of Classification Search
CPC ............ G06F 12/1027; G06F 2212/30; G06F 2212/50; G06F 2212/68; G06F 2212/684

USPC ......................................................... 711/140
See application file for complete search history.

(56) References Cited

U.S. PATENT DOCUMENTS

| 2001/0034854 A1* | 10/2001 | Mukherjee .......... G06F 11/1497 714/47.3 |
| 2007/0174584 A1* | 7/2007 | Kopec ................. G06F 12/1027 711/207 |
| 2010/0138610 A1 | 6/2010 | Rappoport et al. |

(Continued)

OTHER PUBLICATIONS

International Search Report and Written Opinion—PCT/US2019/048207—ISA/EPO—dated Dec. 12, 2019.

*Primary Examiner* — Edward J Dudek, Jr.
*Assistant Examiner* — Sidney Li
(74) *Attorney, Agent, or Firm* — Edward J. Meisarosh

(57) ABSTRACT

A method, apparatus, and system for reducing pipeline stalls due to address translation misses is presented. An apparatus comprises a memory access instruction pipeline, a translation lookaside buffer coupled to the memory access instruction pipeline, and a TLB miss queue coupled to both the TLB and the memory access instruction pipeline. The TLB miss queue is configured to selectively store a first memory access instruction that has been removed from the memory access instruction pipeline as a result of the first memory access instruction missing in the TLB along with information associated with the first memory access instruction. The TLB miss queue is further configured to reintroduce the first memory access instruction to the memory access instruction pipeline associated with a return of an address translation related to the first memory access instruction.

24 Claims, 5 Drawing Sheets

(56) References Cited

U.S. PATENT DOCUMENTS

| | | |
|---|---|---|
| 2011/0107057 A1 | 5/2011 | Petolino, Jr. |
| 2011/0138149 A1* | 6/2011 | Karlsson ............ G06F 12/1027 711/207 |

* cited by examiner

METHOD, APPARATUS, AND SYSTEM FOR REDUCING PIPELINE STALLS DUE TO ADDRESS TRANSLATION MISSES

BACKGROUND

Field

Aspects of the present disclosure relate generally to reducing pipeline stalls, and more specifically to reducing pipeline stalls associated with address translation misses.

Background

Modern computing devices may employ virtual memory techniques to manage their memory hierarchies. As part of managing virtual memory, such computing devices translate the virtual memory addresses used by applications into physical addresses via a memory management unit (MMU). This translation may then be used by a memory queue or a similar hardware block to interact with the main memory. Since the need for such translations can be frequent, mechanisms to cache known or recently used translations have also been developed, which are conventionally known as translation lookaside buffers (TLBs). A TLB serves as a cache for virtual-to-physical translations, which can improve the latency of memory access operations by avoiding the need to traverse a memory hierarchy to perform a virtual-to-physical address translation each time a memory access operation is encountered, since such traversal may be a relatively long-latency operation.

A further complication may arise when a memory access operation has its virtual address miss in the TLB and must wait for the translation from the MMU. A common approach to dealing with a TLB miss as described above is to stall the pipeline of the computing device while waiting on the translation. This means that instructions following the memory access operation are also stalled. However, these subsequent instructions may not result in TLB misses, nor do they necessarily depend on the result of the memory access operation that missed in the TLB. Thus, the cycles that the processor remains stalled and waiting for the translation are effectively wasted, since there are subsequent instructions available that could be executed during this time period, but the pipeline to which they would be assigned is blocked by the memory access operation awaiting its translation.

Thus, it would be desirable to provide a mechanism for allowing instructions subsequent to a memory access operation that misses in the TLB and that do not depend on the memory access operation to be executed while the computing device waits for the address translation associated with the TLB miss to be returned.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In one aspect, an apparatus comprises a memory access instruction pipeline, a translation lookaside buffer coupled to the memory access instruction pipeline, and a TLB miss queue coupled to both the TLB and the memory access instruction pipeline. The TLB miss queue is configured to selectively store a first memory access instruction that has been removed from the memory access instruction pipeline as a result of the first memory access instruction missing in the TLB along with information associated with the first memory access instruction. The TLB miss queue may be further configured to reintroduce the first memory access instruction to the memory access instruction pipeline associated with a return of an address translation related to the first memory access instruction.

In another aspect, a method comprises removing a first memory access instruction that has missed in a TLB from a memory access instruction pipeline to make the memory access instruction pipeline available to other memory access instructions. The method further comprises selectively storing the first memory access instruction and associated information in a TLB miss queue while awaiting address translation for the first memory access instruction. The method may further comprise reintroducing the first memory access instruction to the memory access instruction pipeline associated with a return of the address translation associated with the first memory access instruction.

In yet another aspect, a non-transitory computer-readable medium comprises instruction which, when executed by a processor, cause the processor to remove a first memory access instruction that has missed in a TLB from a memory access instruction pipeline to make the memory access instruction pipeline available to other memory access instructions. The instructions further cause the processor to selectively store the first memory access instruction and associated information in a TLB miss queue while awaiting address translation for the first memory access instruction.

In yet another aspect, an apparatus comprises means for executing memory access instructions, means for caching address translations coupled to the means for executing memory access instructions, and means for storing instructions that miss in the means for caching address translations coupled to the means for caching address translations and to the means for executing memory access instructions. The means for storing instructions that miss is configured to selectively store a first memory access instruction that has been removed from the means for executing memory access instructions as a result of the first memory access instruction missing in the means for caching address translations and information associated with the first memory access instruction.

One advantage of one or more disclosed aspects is that the disclosed aspects permit for improved throughput of a computing device that implements a TLB miss queue as described above, by removing the operation that generated the TLB miss from the pipeline and allowing subsequent memory access operations to proceed. In some aspects, this may decrease power consumption and improve overall system performance.

DETAILED DESCRIPTION

Aspects of the inventive teachings herein are disclosed in the following description and related drawings directed to specific aspects. Alternate aspects may be devised without departing from the scope of the inventive concepts herein. Additionally, well-known elements of the environment may not be described in detail or may be omitted so as not to obscure the relevant details of the inventive teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
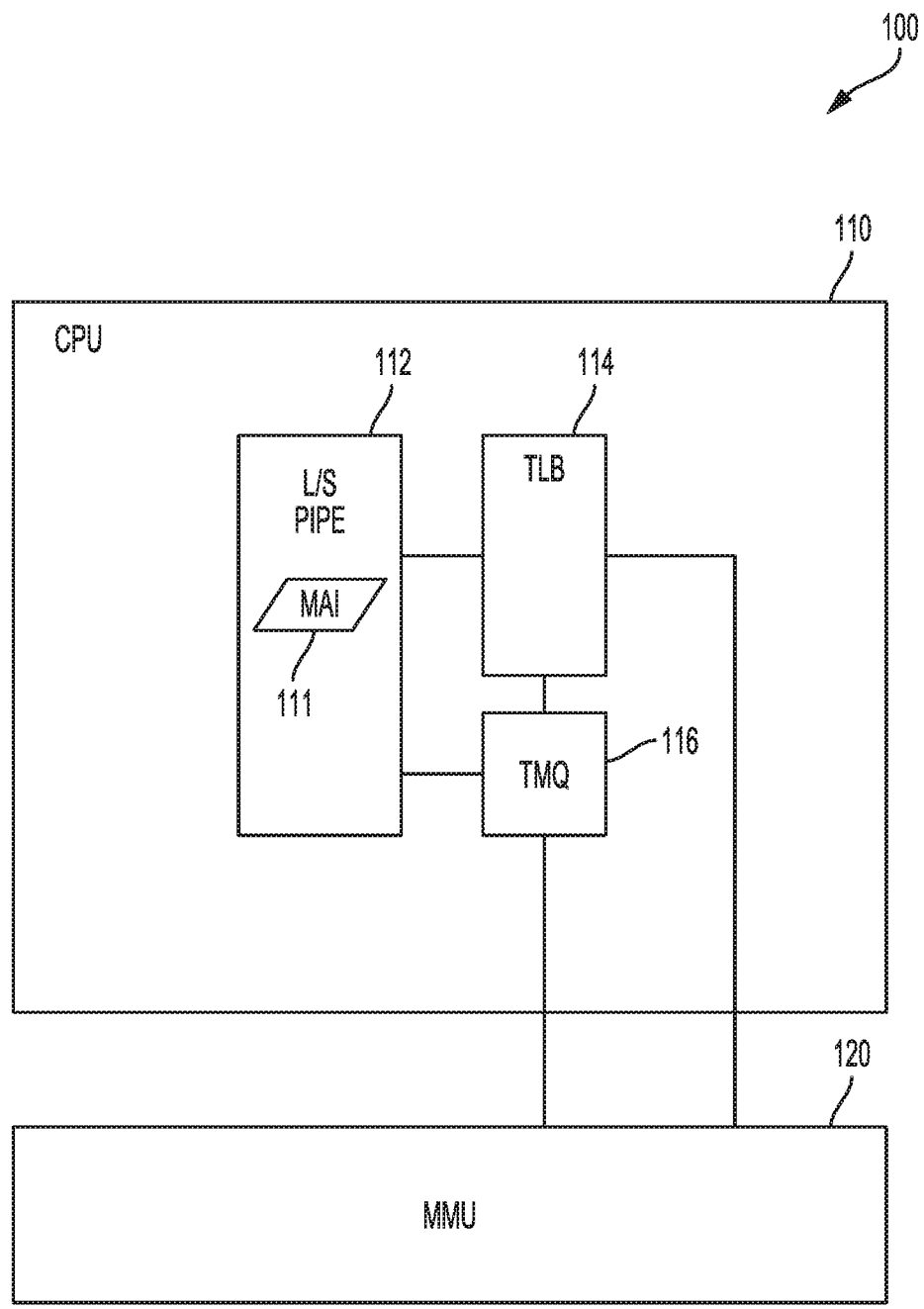
FIG. 1 shows a block diagram of a computing device configured to reduce pipeline stalls due to address translation misses according to certain aspects of the present disclosure.

In this regard, FIG. 1 shows a block diagram of a computing device 100 configured to reduce pipeline stalls due to address translation misses according to certain aspects of the present disclosure. The computing device comprises a central processing unit (CPU) 110 coupled to a memory management unit (MMU) 120. The CPU 110 further comprises a load/store pipeline 112 which is coupled to both a translation lookaside buffer (TLB) 114 and a TLB miss queue 116. The TLB 114 and the TLB miss queue 116 are coupled to each other, and to the MMU 120. The MMU 120 may be coupled to a main memory system (not illustrated) and may be configured to perform page table walks in order to provide address translations back to the TLB 114 and the TLB miss queue 116 as will be described further herein.

During operation, CPU 110 may encounter a memory access instruction 111 (i.e., a load or store instructions) that it may dispatch to the load/store pipeline 112. In order to execute memory access instruction 111, the load/store pipeline 112 may request address translation for the memory access instruction 111 from the TLB 114. If the TLB 114 already has the address translation for memory access instruction 111, it can provide the translation back to the load/store pipeline 112 and execution of memory access instruction 111 may continue. However, if the TLB 114 does not have the address translation for memory access instruction 111, it must request the translation from the MMU 120, which performs a page table walk to determine the translation. A page table walk may involve multiple cycles, and the memory access instruction 111 cannot proceed with execution during this time. However, there may be other subsequent memory access instructions awaiting dispatch to the load/store pipeline 112 from the CPU 110.

In order to allow these subsequent memory access instructions to have access to the load/store pipeline 112 while waiting for the address translation associated with memory access instruction 111 that has missed in the TLB 114, the memory access instruction 111 is temporarily removed from the load/store pipeline 112 and stored in an entry of the TLB miss queue 116. The TLB miss queue 116 comprises a plurality of entries, each of which may store information associated with at least one memory access instruction (e.g., memory access instruction 111). The TLB miss queue 116 may store both load and store instructions in a unified queue, or may maintain separate structures that perform substantially similar miss queue functionality for load and store instructions.

Whether implemented as a unified queue or separate load and store TLB miss queues, the TLB miss queue 116 may track whether or not a particular memory access instruction stored in the queue needs to have a request for address translation submitted to the MMU 120, and may track whether or not the translation for that entry has been received from the MMU 120. Depending on where and how the TLB miss queue 116 is configured to re-introduce a stored memory access instruction such as memory access instruction 111 to the load/store pipeline 112, the TLB miss queue 116 may further store hazard information associated with each stored memory access instruction (if the stored memory access instruction is to be re-inserted in the load/store pipeline 112 at a stage past where hazard checking is performed).

Those having skill in the art will recognize that some kinds of instructions may not be eligible to be placed into the TLB miss queue 116, and in the case of such instructions, the pipeline may be stalled. In particular, instructions that enforce a specific order may not be put into the TLB miss queue 116 (since doing so might allow younger instructions to move ahead of them, which by definition is not permitted). Likewise, other instructions such as barrier instructions that enforce a specific ordering may not be placed in the TLB miss queue 116 in order to avoid deadlock scenarios.

Further, if a memory access instruction misses in the TLB 114, but it is known that the translation associated with that memory access instruction has already been requested and will be available in a relatively short number of cycles, it may be more beneficial to stall the pipeline for that number of cycles, rather than use another entry from the TLB miss queue 116. For example, a threshold number of cycles could be programmed, and if the translation will be available within that number of cycles, the computing device 100 may stall and wait for the translation, rather than storing the memory access instruction in the TLB miss queue 116. Determining the threshold may depend on many factors such as the latency of translation requests, the architecture of the pipelines and the TLB, the size and pipeline re-entry policy(s) of the TLB miss queue 116, and other related factors. Alternatively, rather than stalling the memory access instruction in place in the load/store pipeline 112, the memory access instruction may be re-introduced into the load/store pipeline 112 as described above instead of or in addition to stalling the load/store pipeline 112 for some number of cycles.

Figure 2:
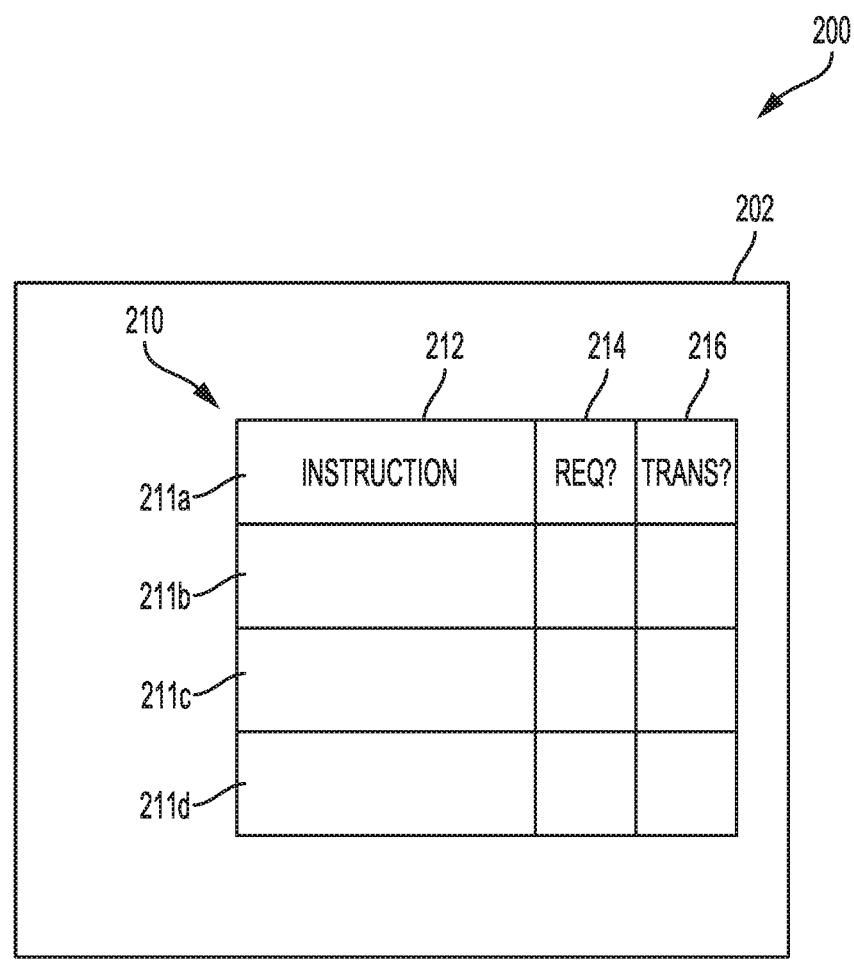
FIG. 2 shows a detailed diagram of an exemplary TLB miss queue according to certain aspects of the present disclosure.

In this regard, FIG. 2 shows a detailed diagram 200 of an exemplary TLB miss queue 202 according to certain aspects of the present disclosure. The TLB miss queue 202 includes a storage structure 210 comprising a plurality of entries 211a-d. Each of the entries 211a-d comprises an instruction field 212, a "needs request" field 214, and a "has translation" field 216. The instruction field 212 may be used to store a specific memory access instruction (such as memory access instruction 111 described with respect to FIG. 1), and may also be used as an index to determine a related page of memory for which a translation has been requested. The "needs request" field 214 stores an indicator of whether the memory access instruction associated with that entry needs to submit a request for address translation, or whether a request for address translation for the related page of memory has already been submitted. This may occur, for example, when two memory access instructions both miss in the TLB 114, and both target the same page of memory. The first of the two memory access instructions will be placed in the TLB miss queue 202 and will trigger a page table walk in the MMU 120. The second memory access instruction will be stored in the TLB miss queue 202, but the TLB miss queue 202 may be configured to compare the second memory access instruction against any other memory access instructions currently stored in the TLB miss queue (i.e., active entries of the TLB miss queue) and which have pending address translation requests, and may set the "needs request" field 214 to indicate that no associated address translation request should be generated if the second memory access instruction targets a page for which an address translation request is already in flight. The "has translation" field 216 indicates whether or not a translation has been received for the particular entry.

Figure 3:
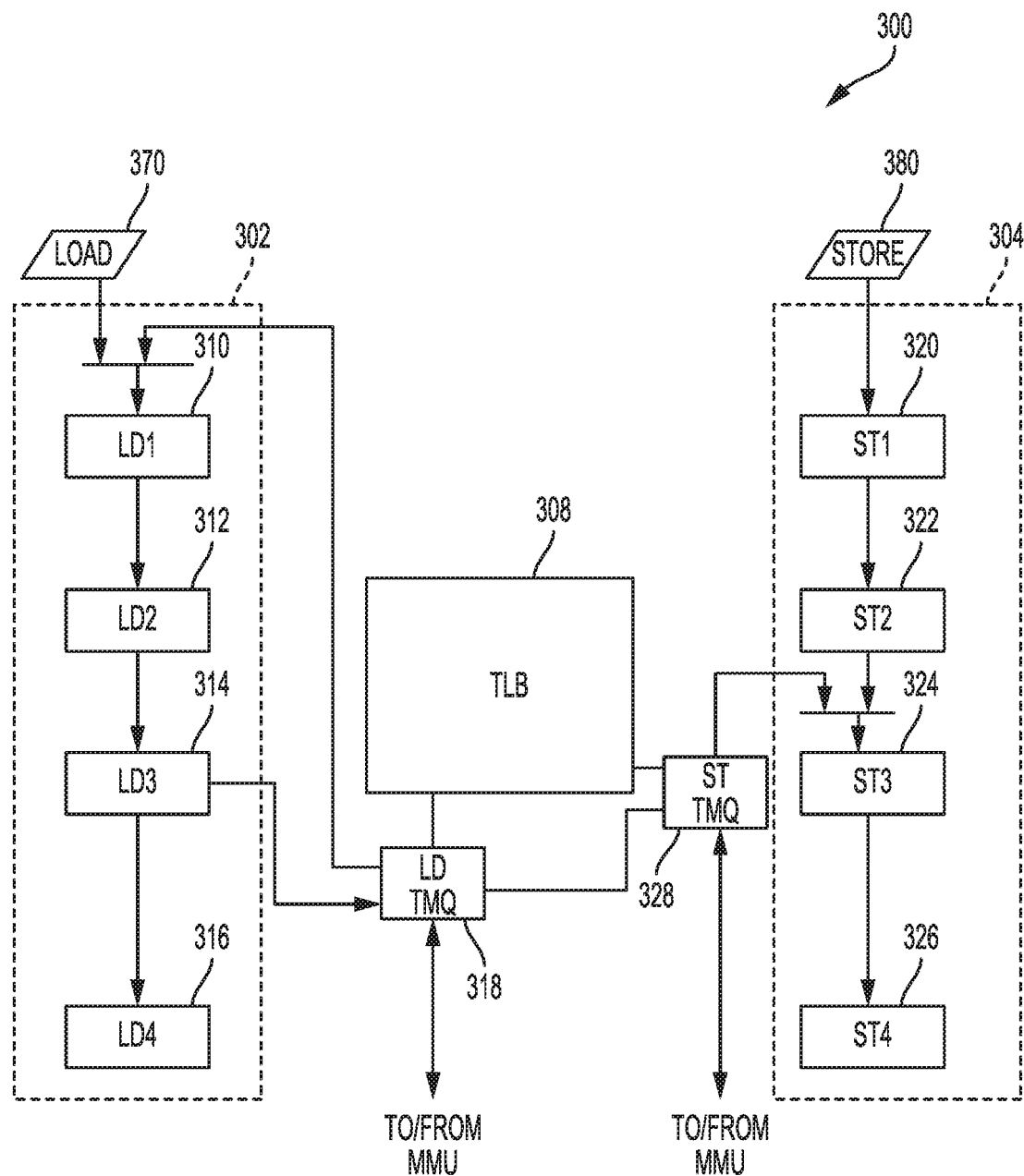
FIG. 3 shows a detailed diagram of an implementation of a TLB miss queue associated with a load pipeline and a store pipeline according to certain aspects of the present disclosure.

Those having skill in the art will recognize that whether to implement the TLB miss queue as a unified or separate load/store structures, how many entries the queue(s) contain, where the queue(s) reintroduce instructions into a pipeline (load, store, or combined load/store) and thus how much storage space to use for data related to the instructions stored in the queue (e.g., "needs request," "has translation," hazard information, and the like), are all matters of design choice, and are within the scope of the teachings of the present disclosure. To that end, FIG. 3 shows a detailed diagram of an implementation 300 of a TLB miss queue associated with a load pipeline and a store pipeline according to one aspect.

The illustrated implementation 300 has a separate load pipeline 302 and store pipeline 304, each having four illustrated stages (stage LD1 310, stage LD2 312, stage LD3 314, and stage LD4 316 for the load pipeline 302, stage ST1 320, stage ST2 322, stage ST3 324, and stage ST4 326 for the store pipeline 304). The load pipeline 302 and the store pipeline 304 are coupled to a common TLB 308. The load pipeline 302 is associated with a load TLB miss queue 318, which is configured to re-insert instructions at the LD1 stage 310 of the load pipeline 302. The store pipeline 304 is associated with a store TLB miss queue 328, which is configured to re-insert instructions at the ST3 stage 324 of the store pipeline 304. The load TLB miss queue 318 and the store TLB miss queue 328 are coupled together to enable the detection and suppression of redundant page translation requests, as discussed earlier with respect to FIG. 3 (i.e., a load instruction 370 that needs the same page translation as a store instruction 380 that has already issued a page translation request to a higher level TLB or MMU will not issue its own independent translation request, and vice versa).

In an illustrated aspect, the load TLB miss queue 318 may correspond to the TLB miss queue 202 of FIG. 2 and may contain 4 entries that each store an instruction, a "needs request" field, and a "has translation" field. Because the load TLB miss queue 318 does not track hazards associated with the entries, it may re-introduce instructions into the load pipeline 302 at a stage where those instructions will be re-checked for hazards as they flow through the load pipeline 302. In the illustrated aspect, hazard checking is performed in the LD1 stage 310 and the LD2 stage 312, so the load TLB miss queue 318 re-introduces instructions into the load pipeline 302 before the LD1 stage 310. In contrast, the store TLB miss queue 328 may contain only a single entry, but because it has fewer entries, it may contain the same information as the load TLB miss queue 318 and may additionally contain full hazard checking information to allow an instruction stored in the store TLB miss queue 328 to participate in hazard checking while awaiting its associated translation (i.e., from a higher level TLB or from a page table walk). Because the store TLB miss queue 328 implements full hazard checking for an instruction stored therein, it may re-introduce the instruction into the store pipeline 304 at the same stage where the instruction was removed from the pipeline (in the illustrated example, in the ST3 stage 324).

Those having skill in the art will recognize that the choice of how many entries and how much information to store in each of the load TLB miss queue 318 and the store TLB miss queue 328 is a design choice, and may depend on such factors as the area consumed by physical structures associated with storing the instructions and information, the relative frequency and latency penalties associated with load instructions and store instructions. Further, the choice of re-entry point for instructions may depend on similar factors. Additionally, implementations with multiple load, multiple store, or multiple combined load/store pipelines are possible, and as long as the multiple pipelines implement similar approaches with respect to re-entry points and hazard checking and information storage, load or store instructions may re-enter any pipeline capable of servicing that type of instruction.

Figure 4:
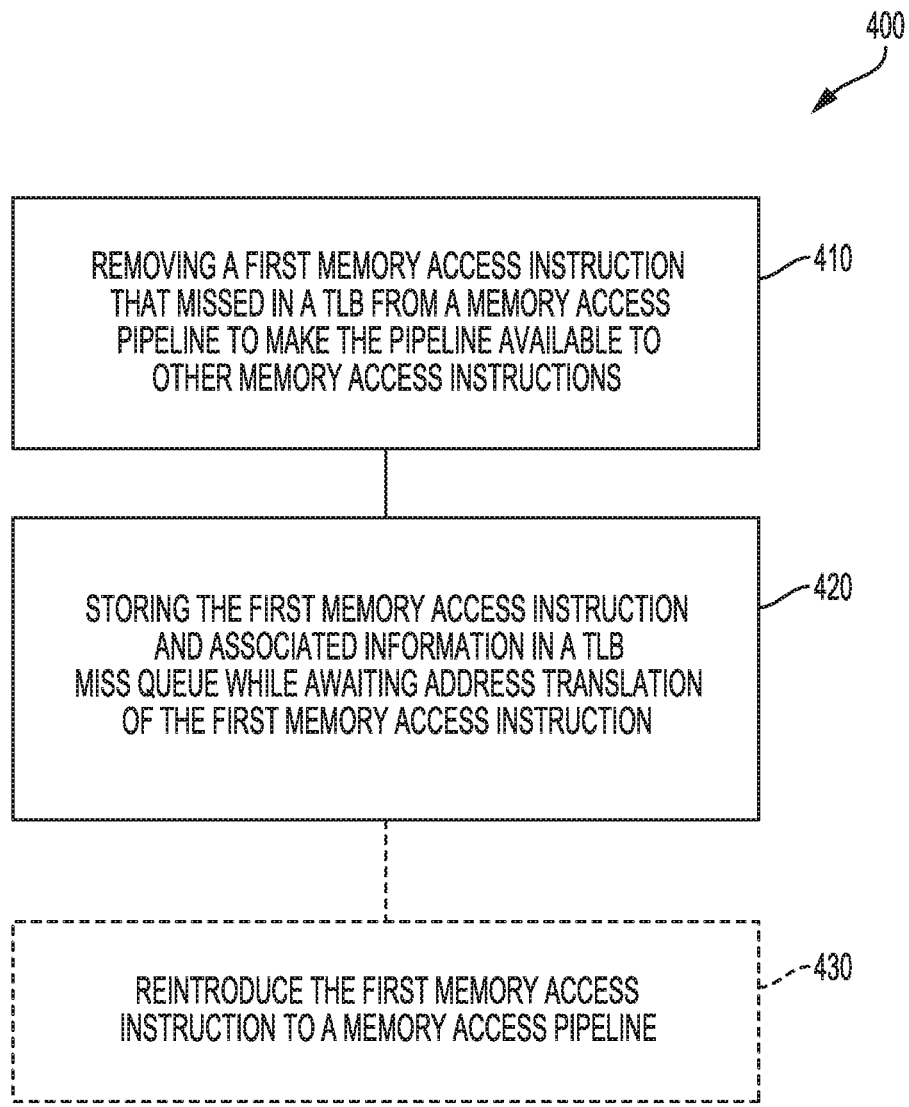
FIG. 4 shows a block diagram of a method of reducing pipeline stalls due to address translation misses according to certain aspects of the present disclosure.

FIG. 4 shows a block diagram of a method 400 of reducing pipeline stalls due to address translation misses according to certain aspects of the present disclosure. The method 400 begins at block 410, by removing a first memory access instruction that missed in a TLB from a memory access pipeline to make the pipeline available to other memory access instructions. For example, with respect to FIG. 1, memory access instruction 111 is removed from the load/store pipeline 112 after missing in the TLB 114 to allow subsequent memory access instructions to use the load/store pipeline 112.

The method 400 continues in block 420, by selectively storing the first memory access instruction and associated information in a TLB miss queue while awaiting address translation for the first memory access instruction. For example, with respect to FIG. 1, memory access instruction 111 is stored in an entry of the TLB miss queue 116. The TLB miss queue may correspond to the TLB miss queue 202 of FIG. 2, the load TLB miss queue 318 of FIG. 3, or the store TLB miss queue 328 of FIG. 3, in some aspects.

The method 400 may further continue in block 430 by reintroducing the first memory access instruction to a memory access pipeline. For example, with respect to FIG. 1, the memory access instruction 111 may be reintroduced to the load/store pipeline 112. As discussed with respect to FIGS. 1-3, reintroducing the first memory access instruction into the pipeline may be accomplished in a variety of ways, all of which are within the scope of the teachings of this disclosure. Further, the timing of the reintroduction of the first memory access instruction into the pipeline may vary. In one aspect, the system may wait until the associated address translation has returned from the higher level TLB or page table walk to reintroduce the first memory access instruction into the pipeline. In another aspect, the system may track and anticipate the return of the address translation, and may reintroduce the first memory access instruction into the pipeline so that it will arrive in the pipeline stage where address translation is performed before or concurrently with the associated address translation.

Figure 5:
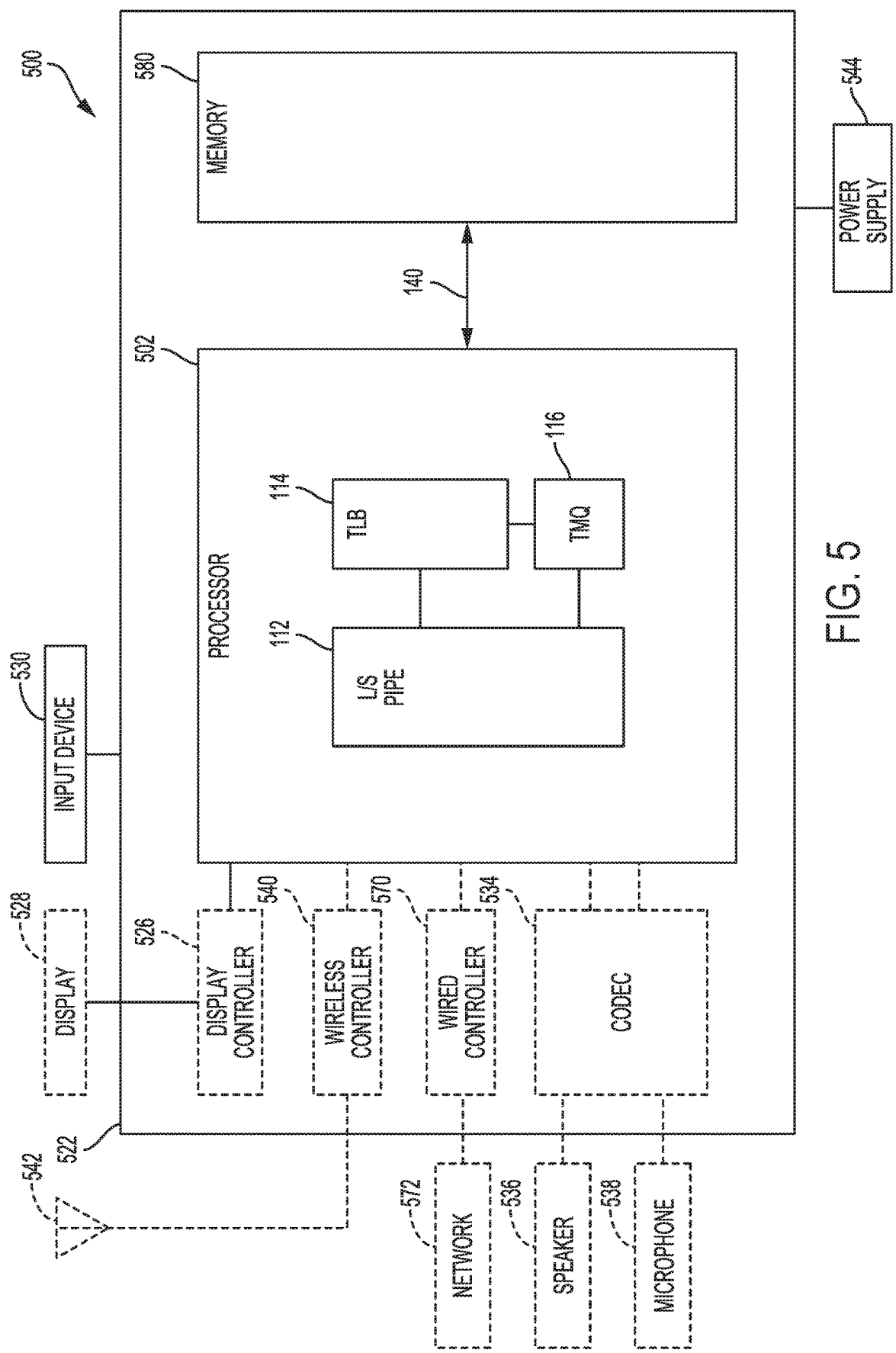
FIG. 5 shows a system-level diagram of a computing device configured to reduce pipeline stalls due to address translation misses according to certain aspects of the present disclosure.

An example apparatus in which aspects of this disclosure may be utilized will now be discussed in relation to FIG. 5. FIG. 5 shows a diagram of a computing device 500 incorporating a structure for reducing pipeline stalls due to address translation misses as described with respect to FIGS. 1, 2, and 3, and which may be operable in accordance with the method described in FIG. 4. In that regard, the system 500 includes the processor 502 which may incorporate the load/store pipeline 112, the TLB 114, and the TLB miss queue 116 of FIG. 1 (which may further correspond to the TLB miss queue 202 of FIG. 2, and any of the elements of the implementation 300 of FIG. 3). The system 500 further includes the main memory system 580 coupled to the processor 502 via the system bus 140. The main memory system 580 may further store non-transitory computer-readable instructions that, when executed by the processor 502, may perform the method 400 of FIG. 4.

FIG. 5 also shows optional blocks in dashed lines, such as coder/decoder (CODEC) 534 (e.g., an audio and/or voice CODEC) coupled to processor 502; speaker 536 and microphone 538 coupled to CODEC 534; and wireless antenna 542 coupled to wireless controller 540 which is coupled to processor 502. Further, the system 502 also shows display controller 526 that is coupled to processor 502 and to display 528, and wired network controller 570 coupled to processor 502 and to a network 572. Where one or more of these optional blocks are present, in a particular aspect, processor 502, display controller 526, memory 580, and wireless controller 540 may be included in a system-in-package or system-on-chip device 522.

Accordingly, a particular aspect, input device 530 and power supply 544 are coupled to the system-on-chip device 522. Moreover, in a particular aspect, as illustrated in FIG. 5, where one or more optional blocks are present, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 generally depicts a computing device, the processor 502 and the memory 580 may also be integrated into a mobile phone, a communications device, a computer, a server, a laptop, a tablet, a personal digital assistant, a music player, a video player, an entertainment unit, and a set top box, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. An apparatus, comprising:
   a memory access instruction pipeline;
   a translation lookaside buffer (TLB) coupled to the memory access instruction pipeline; and
   a TLB miss queue coupled to the TLB and to the memory access instruction pipeline;

wherein the TLB miss queue is configured to selectively store both:
a first memory access instruction that has been removed from the memory access instruction pipeline as a result of the first memory access instruction missing in the TLB; and
information associated with the first memory access instruction.

2. The apparatus of claim 1, wherein the TLB miss queue is further configured to reintroduce the first memory access instruction to the memory access instruction pipeline associated with a return of an address translation related to the first memory access instruction.

3. The apparatus of claim 1, wherein the TLB miss queue is further configured to compare a memory page associated with the first memory access instruction to the memory pages associated with all the active entries of the TLB miss queue; and
to generate a translation request if the memory page associated with the first memory access instruction does not match the memory pages associated with any of the active entries of the TLB miss queue, or
to suppress a translation request if the memory page associated with the first memory access instruction matches any of the memory pages associated with any of the active entries of the TLB miss queue.

4. The apparatus of claim 1, wherein the TLB miss queue is further configured to compare a memory page associated with the first memory access instruction to address translations that are expected to be received, and if the address translation corresponding to the memory page associated with the first memory access instruction is expected to be received within a particular number of cycles, suppress storing the first memory access instruction and associated information in the TLB miss queue and stall the memory access instruction pipeline until the address translation is received.

5. The apparatus of claim 1, wherein the memory access instructions comprise load instructions and store instructions.

6. The apparatus of claim 5, wherein the TLB miss queue is a unified TLB miss queue configured to store both load instructions and store instructions.

7. The apparatus of claim 5, wherein the TLB miss queue comprises a separate load TLB miss queue configured to store load instructions that miss in the TLB and associated information and a store TLB miss queue configured to store instructions that miss in the TLB and associated information.

8. The apparatus of claim 7, wherein the load TLB miss queue and the store TLB miss queue are heterogeneous designs.

9. The apparatus of claim 2, wherein the information associated with the first memory access instruction does not comprise hazard detection information, and wherein the TLB miss queue is further configured to reintroduce the first memory access instruction to the memory access instruction pipeline such that the memory access instruction pipeline will perform hazard detection on the first memory access instruction as if it were a new instruction.

10. The apparatus of claim 2, wherein the information associated with the first memory access instruction comprises hazard detection information, and wherein the TLB miss queue is further configured to reintroduce the first memory access instruction to the memory access instruction pipeline such that the memory access instruction pipeline does not perform hazard detection on the first memory access instruction as if it were a new instruction.

11. The apparatus of claim 2, wherein the TLB miss queue is further configured to reintroduce the first memory access instruction to the memory access instruction pipeline a number of cycles in advance of the return of the address translation related to the first memory access instruction.

12. The apparatus of claim 1, wherein the TLB miss queue is further configured to reintroduce the first memory access instruction to a second memory access instruction pipeline associated with a return of an address translation related to the first memory access instruction.

13. The apparatus of claim 1, integrated into a computing device.

14. The apparatus of claim 13, the computing device further integrated into a device selected from the group consisting of a mobile phone, a communications device, a computer, a server, a laptop, a tablet, a personal digital assistant, a music player, a video player, an entertainment unit, and a set top box.

15. A method comprising:
removing, from a memory access instruction pipeline, a first memory access instruction that has missed in a translation lookaside buffer (TLB) to make the memory access instruction pipeline available to other memory access instructions; and
selectively storing both the first memory access instruction and associated information in a TLB miss queue, which is coupled to the TLB and to the memory access instruction pipeline, while awaiting an address translation for the first memory access instruction.

16. The method of claim 15, further comprising reintroducing the first memory access instruction to the memory access instruction pipeline associated with a return of the address translation associated with the first memory access instruction.

17. The method of claim 15, further comprising:
comparing a memory page associated with the first memory address instruction to the memory pages associated with all the active entries of the TLB miss queue; and
generating a translation request for the first memory access instruction if the memory page associated with the first memory access instruction does not match the memory pages associated with any of the active entries of the TLB miss queue; or
suppressing generating a translation request for the first memory access instruction if the memory page associated with the first memory access instruction matches any of the memory pages associated with any of the active entries of the TLB miss queue.

18. The method of claim 15, further comprising:
comparing a memory page associated with the first memory access instruction to address translations that are expected to be received; and
if the address translation corresponding to the memory page associated with the first memory access instruction is expected to be received within a particular number of cycles, suppressing storing the first memory access instruction and associated information in the TLB miss queue and stalling the memory access instruction pipeline until the address translation corresponding to the memory page associated with the first memory access instruction is received.

19. The method of claim 16, wherein the information associated with the first memory access instruction does not comprise hazard detection information, and wherein reintroducing the first memory access instruction to the memory access instruction pipeline is performed at a stage of the memory access instruction pipeline such that the memory access instruction pipeline will perform hazard detection on the first memory access instruction after its reintroduction as if it were a new instruction.

20. The method of claim 16, wherein the information association with the first memory access instruction comprises hazard detection information, and wherein reintroducing the first memory access instruction to the memory access instruction pipeline is performed at a stage of the memory access instruction pipeline such that the memory access instruction pipeline will not perform hazard detection on the first memory access instruction after its reintroduction as if it were a new instruction.

21. The method of claim 16, wherein reintroducing the first memory access instruction to the memory access instruction pipeline is performed a number of cycles in advance of the return of the address translation associated with the first memory access instruction.

22. The method of claim 15, further comprising reintroducing the first memory access instruction to a second memory access instruction pipeline associated with a return of the address translation associated with the first memory access instruction.

23. A non-transitory computer readable medium comprising instructions which, when executed by a processor, cause the processor to:
   remove, from a memory access instruction pipeline, a first memory access instruction that has missed in a translation lookaside buffer (TLB) to make the memory access instruction pipeline available to other memory access instructions; and
   selectively store both the first memory access instruction and associated information in a TLB miss queue, which is coupled to the TLB and to the memory access instruction pipeline, while awaiting an address translation for the first memory access instruction.

24. An apparatus comprising:
   means for executing memory access instructions;
   means for caching address translations coupled to the means for executing memory access instructions; and
   means for storing instructions that miss in the means for caching address translations coupled to the means for caching address translations and to the means for executing memory access instructions;
wherein the means for storing instructions that miss is configured to selectively store both:
   a first memory access instruction that has been removed from the means for executing memory access instructions as a result of the first memory access instruction missing in the means for caching address translations; and
   information associated with the first memory access instruction.

* * * * *